(12) United States Patent
Akanksha et al.

(10) Patent No.: US 12,236,394 B1
(45) Date of Patent: Feb. 25, 2025

(54) SYNCHRONIZATION OF PHYSICAL DELIVERY WITH METAVERSE ACTIVITY

(71) Applicant: INTERNATIONAL BUSINESS MACHINES CORPORATION, Armonk, NY (US)

(72) Inventors: Akanksha, Bangalore (IN); Sarbajit K. Rakshit, Kolkata (IN); Shailendra Moyal, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/454,257

(22) Filed: Aug. 23, 2023

(51) Int. Cl.
*G06Q 10/083* (2024.01)

(52) U.S. Cl.
CPC ................. *G06Q 10/0838* (2013.01)

(58) Field of Classification Search
CPC .................................. G06Q 10/0838
See application file for complete search history.

(56) References Cited

U.S. PATENT DOCUMENTS

| 11,420,109 | B2 | 8/2022 | Shantharam | |
|---|---|---|---|---|
| 2017/0316701 | A1* | 11/2017 | Gil | B64F 1/10 |
| 2021/0357959 | A1* | 11/2021 | Cella | G06Q 10/0838 |
| 2021/0399881 | A1 | 12/2021 | Hwang | |
| 2022/0242450 | A1 | 8/2022 | Sokolov | |
| 2023/0004933 | A1* | 1/2023 | Heinla | G06Q 10/0833 |

FOREIGN PATENT DOCUMENTS

WO 20151683571 W 11/2015

OTHER PUBLICATIONS

Burke, R. R. (2002). Technology and the Customer Interface: What Consumers Want in the Physical and Virtual Store, Abstract (Year: 2002).*
Carolo, "3D Printed Food: All You Need to Know", All3DP, https://all3dp.com/2/3d-printed-food-3d-printing-food/, Feb. 24, 2023, 19 Pages.

(Continued)

*Primary Examiner* — Ibrahim N El-Bathy
(74) *Attorney, Agent, or Firm* — Robert R. Aragona

(57) ABSTRACT

An embodiment for synchronization of physical delivery with a metaverse activity is provided. The embodiment may include receiving real-time and historical data relating to a metaverse activity. The embodiment may also include identifying a context of the metaverse activity. The embodiment may further include in response to determining at least one user requires physical delivery of one or more physical objects, identifying a time at which the at least one user requires the physical delivery of the one or more physical objects during the metaverse activity. The embodiment may also include causing at least one robotic device to onboard the one or more physical objects to be delivered in advance of the required time. The embodiment may further include deploying the at least one robotic device to deliver the onboarded one or more physical objects to a physical location of the at least one user at the required time.

17 Claims, 3 Drawing Sheets

(56) References Cited

OTHER PUBLICATIONS

Disclosed Anonymously, "Method and System for Artificial Intelligence (AI)-Enabled Virtual Reality (VR) Gamification-Based Content Alignment Among Multiple Collocated Users in Any Collaborative Physical Activity", IPCOM000265922D, May 25, 2021, 4 Pages.

Mitra, "Metaverse: A Potential Virtual-Physical Ecosystem for Innovative Blended Education and Training", Journal of Metaverse, Jun. 30, 2023, vol. 3, Issue 1, pp. 66-72.

Mukherjee, "Virtual Meets Physical: Unravelling The Metaverse Mystery", Outlook Publishing India Pvt. Ltd., https://www.outlookindia.com/culture-society/virtual-meets-physical-unravelling-the-metaverse-mystery-news-183231, Feb. 20, 2022, 12 Pages.

Nopanen, "Bringing physical world to life in the Metaverse", My Metaverse Day, https://mymetaverseday.com/2022/01/11/connectingworlds/, Nov. 21, 2022, 9 Pages.

Popovski, "Synchronizing the Physical Devices with the Metaverse", IEEE Communications Society, Feb. 14, 2023, 5 Pages.

Reuters, "Metaverse: Technology that merges virtual, physical worlds soon to become a reality, Meta says", Mint, https://www.livemint.com/technology/tech-news/metaverse-technology-that-merges-virtual-physical-worlds-soon-to-become-a-reality-meta-says-11645408692319.html, Feb. 21, 2022, 4 Pages.

Tran, "Food in the Metaverse, Cell-Cultivated Psychedlics + More", Food Tech Connect, https://foodtechconnect.com/2022/02/14/food-in-the-metaverse-cell-cultivated-psychedelics-more/, Feb. 14, 2022, 4 Pages.

Xu, et al., "Generative AI-empowered Effective Physical-Virtual Synchronization in the Vehicular Metaverse", arXiv:2301.07636v2 [cs.AI], Jan. 19, 2023, 7 Pages.

\* cited by examiner

SYNCHRONIZATION OF PHYSICAL DELIVERY WITH METAVERSE ACTIVITY

BACKGROUND

The present invention relates generally to the field of computing, and more particularly to a system for synchronization of physical delivery with a metaverse activity.

The metaverse is a concept of an online, 3D virtual space connecting users in various aspects of their lives. The metaverse may connect multiple platforms similar to how the internet contains different websites accessible through a single web browser. The metaverse may be driven by augmented reality (AR), where each user controls a character or avatar. For example, a user may attend a mixed reality meeting in a virtual office with an AR or virtual reality (VR) headset, play a blockchain-based game, and/or manage a financial portfolio. In addition to supporting gaming and social media, the metaverse may combine economies, digital identity, decentralized governance, and other applications.

SUMMARY

According to one embodiment, a method, computer system, and computer program product for synchronization of physical delivery with a metaverse activity is provided. The embodiment may include receiving real-time and historical data relating to a metaverse activity. The embodiment may also include identifying a context of the metaverse activity based on the real-time data. The embodiment may further include in response to determining at least one user requires a physical delivery of one or more physical objects based on the real-time and the historical data, identifying a required time at which the at least one user requires the physical delivery of the one or more physical objects during the metaverse activity based on the identified context. The embodiment may also include causing at least one robotic device to onboard the one or more physical objects to be delivered in advance of the required time. The embodiment may further include deploying the at least one robotic device to deliver the onboarded one or more physical objects to a physical location of the at least one user at the required time.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
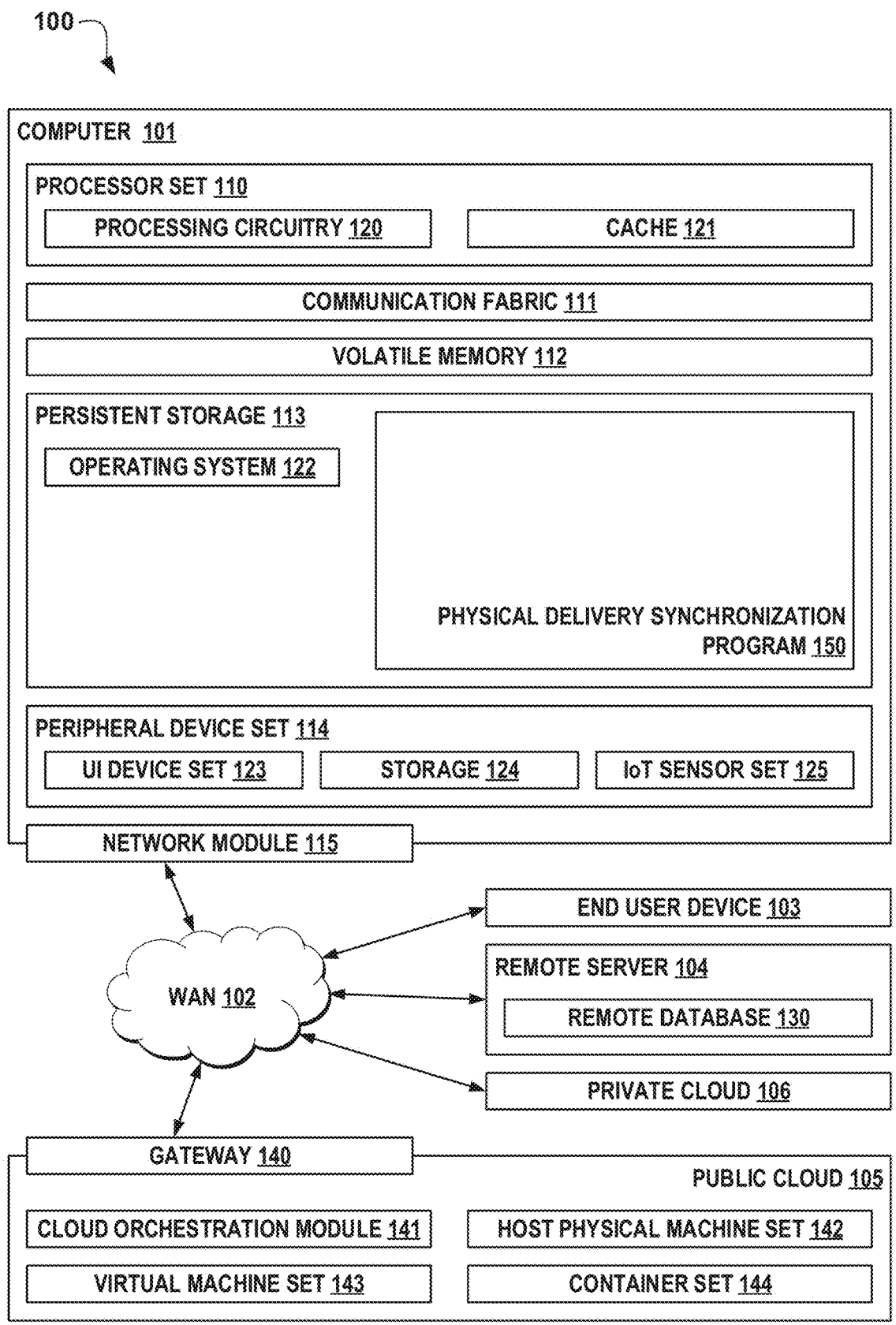
FIG. 1 illustrates an exemplary computing environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for synchronization of physical delivery with a metaverse activity. The following described exemplary embodiments provide a system, method, and program product to, among other things, cause one or more robotic devices to onboard one or more physical objects and, accordingly, deploy the one or more robotic devices to deliver the onboarded one or more physical objects to a physical location of the user at a required time. Therefore, the present embodiment has the capacity to improve augmented reality (AR) and virtual reality (VR) technology by enhancing the level of experience of a user in a metaverse activity.

As previously described, the metaverse is a concept of an online, 3D virtual space connecting users in various aspects of their lives. The metaverse may connect multiple platforms similar to how the internet contains different websites accessible through a single web browser. The metaverse may be driven by augmented reality (AR), where each user controls a character or avatar. For example, a user may attend a mixed reality meeting in a virtual office with an AR or virtual reality (VR) headset, play a blockchain-based game, and/or manage a financial portfolio. In addition to supporting gaming and social media, the metaverse may combine economies, digital identity, decentralized governance, and other applications. While participating in a metaverse activity, there is a lack of synchronization between the virtual and the real world. This problem is typically addressed by a user pausing or leaving the metaverse activity to perform a physical activity. However, the user pausing or leaving the metaverse activity fails to synchronize the provision of physical services with a context of the metaverse activity.

It may therefore be imperative to have a system in place to synchronize the provision of physical services with a context of the metaverse activity. Thus, embodiments of the present invention may provide advantages including, but not limited to, enhancing the level of experience of a user in a metaverse activity, synchronizing the provision of physical services with a context of the metaverse activity, and proactively onboarding objects for physical delivery. The present invention does not require that all advantages need to be incorporated into every embodiment of the invention.

According to at least one embodiment, when a user is participating in a metaverse activity, real-time and historical data relating to the metaverse activity may be received in order to identify a context of the metaverse activity based on the real-time data. Upon identifying the context, it may be determined whether at least one user in the metaverse activity requires a physical delivery of one or more physical objects based on the real-time and the historical data. In response to determining the at least one user requires the physical delivery, a required time at which the at least one user requires the physical delivery of the one or more physical objects during the metaverse activity may be identified based on the identified context so that at least one robotic device may be caused to onboard the one or more physical objects to be delivered in advance of the required time. Then, the at least one robotic device may be deployed to deliver the onboarded one or more physical objects to a physical location of the at least one user at the required time. According to at least one other embodiment, one or more physical interactions of the at least one user with the delivered one or more physical objects may be integrated into the metaverse activity.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to cause one or more robotic devices to onboard one or more physical objects and, accordingly, deploy the one or more robotic devices to deliver the onboarded one or more physical objects to a physical location of the user at a required time.

Referring to FIG. 1, an exemplary computing environment 100 is depicted, according to at least one embodiment. Computing environment 100 contains an example of an environment for the execution of at least some of the computer code involved in performing the inventive methods, such as a physical delivery synchronization program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. Peripheral device set 114 may also include a robotic device and/or any other device for providing physical delivery of objects to users.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the physical delivery synchronization program 150 may be a program capable of receiving real-time and historical data relating to a metaverse activity, causing one or more robotic devices to onboard one or more physical objects, deploying the one or more robotic devices to deliver the onboarded one or more physical objects to a physical location of the user at a required time, enhancing the level of experience of the user in a metaverse activity, synchronizing the provision of physical services with a context of the metaverse activity, and proactively onboarding objects for physical delivery. Furthermore, notwithstanding depiction in computer 101, the physical delivery synchronization program 150 may be stored in and/or executed by, individually or in any combination, end user device 103, remote server 104, public cloud 105, and private cloud 106. The physical delivery synchronization method is explained in further detail below with respect to FIG. 2.

Figure 2:
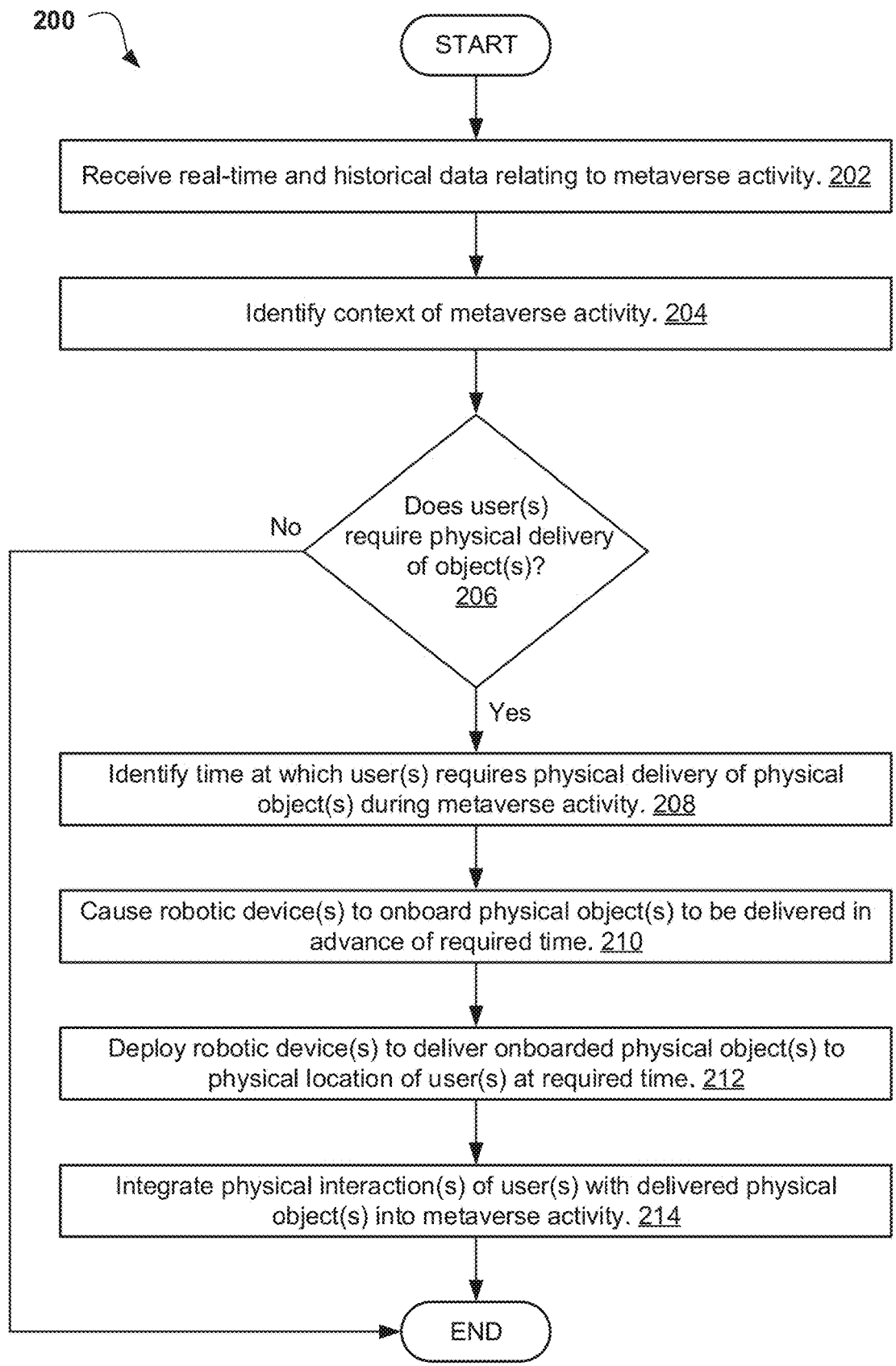
FIG. 2 illustrates an operational flowchart for synchronization of physical delivery with a metaverse activity in a physical delivery synchronization process according to at least one embodiment.

Referring now to FIG. 2, an operational flowchart for synchronization of physical delivery with a metaverse activity in a physical delivery synchronization process 200 is depicted according to at least one embodiment. At 202, the physical delivery synchronization program 150 receives the real-time and the historical data relating to the metaverse activity. As used herein, "metaverse activity" means any extended reality (XR) activity, such as AR and/or VR.

The real-time data relating to the metaverse activity may include the type of activity being performed in the metaverse. For example, the at least one user may be participating in a virtual party. In another example, the at least one user may be participating in a virtual office meeting. The real-time data relating to the metaverse activity may also include data from wearable devices of the user. For example, an AR or VR headset may capture movements of the at least one user, and a smartwatch may capture biometrics of the at least one user. The real-time data relating to the metaverse activity may further include a video feed and/or audio of the metaverse activity. For example, the video feed may include the at least one user socializing with other users and the audio may include a conversation between the users.

The historical data relating to the metaverse activity may include movements and biometrics of the at least one user during a past metaverse activity. The historical data may also include what physical services were provided to the at least one user during the past metaverse activity. For example, during the past metaverse activity, the biometrics of the at least one user may indicate the at least one user gets dehydrated after talking for more than five minutes. Continuing the example, water may have been provided to the at least one user during the past metaverse activity. The historical data may be contained in a knowledge corpus, such as remote database 130.

Then, at 204, the physical delivery synchronization program 150 identifies the context of the metaverse activity. The context of the metaverse activity is identified based on the real-time data. The context of the metaverse activity may be identified from the video feed and/or the audio of the metaverse activity. The context may include the activity in which the at least one user is engaged. For example, the video feed and/or the audio may indicate that the at least one user is engaged in conversation at a virtual holiday party. In another example, the video feed and/or the audio may indicate that food is being served on a table during the metaverse activity and the at least one user is walking toward the table.

Next, at 206, the physical delivery synchronization program 150 determines whether the at least one user in the metaverse activity requires the physical delivery of the one or more physical objects. The determination is made based on the real-time and the historical data. As used herein, the qualifier "physical" refers to the real world as opposed to the virtual world. Examples of the physical object may include, but are not limited to, a food, a drink, and/or a package. For example, the food may be a sandwich and the drink may be water. The package delivered may include a variety of contents. For example, the package may include important business documents or medication for the at least one user.

Figure 3:
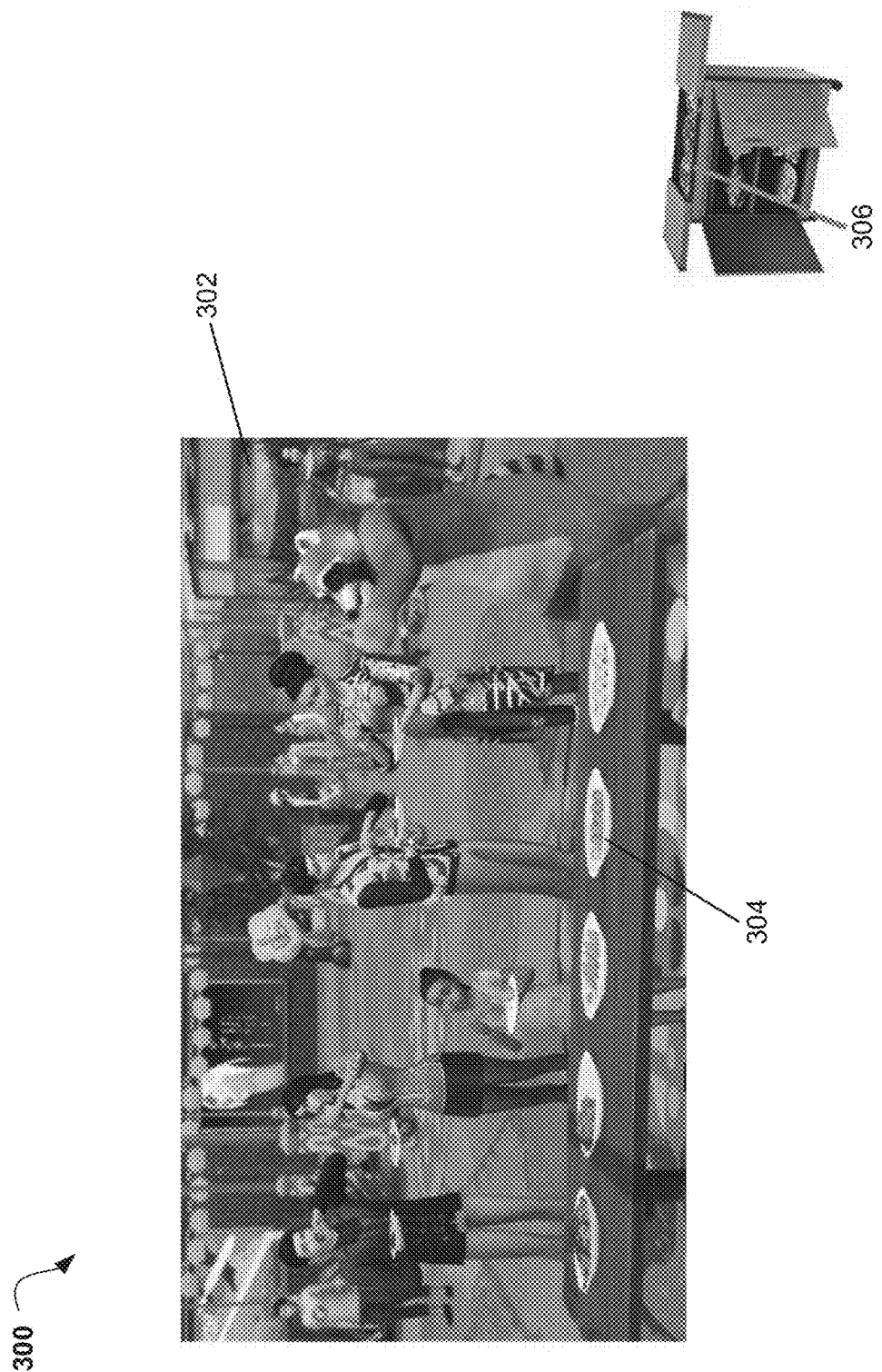
FIG. 3 is an exemplary diagram depicting users participating in a metaverse activity according to at least one embodiment.

As described above with respect to step 202, the real-time data relating to the metaverse activity may include the video feed and/or audio of the metaverse activity. The physical delivery synchronization program 150 may perform image and/or audio analysis on the metaverse activity content to determine whether the at least one user in the metaverse activity requires the physical delivery of the one or more physical objects. For example, the image analysis may indicate that food is being served on a table in the metaverse and the at least one user is walking toward and/or gesturing (e.g., pointing toward) the table with the food, as illustrated in FIG. 3. In this example, since the at least one user is walking toward the table with the food in the metaverse, the physical delivery synchronization program 150 may determine the at least one user requires the delivery of food in the real world to align with the metaverse activity. In another example, the audio analysis may indicate the at least one user said, "After this song, I'm going to get something to eat." In this example, since the at least one user verbally expressed a desire to eat, the physical delivery synchronization program 150 may determine the at least one user requires the delivery of food in the real world to align with the metaverse activity.

Also, as described above with respect to step 202, the historical data may include the movements and biometrics of the at least one user during a past metaverse activity, and what physical services were provided to the user during the past metaverse activity. For example, during the past metaverse activity, the biometrics of the at least one user may indicate the at least one user gets dehydrated after talking for more than five minutes, and that water may have been provided to the at least one user in the real world during the past metaverse activity. In this example, since the at least one user was dehydrated after talking for more than five minutes in the past metaverse activity, the physical delivery synchronization program 150 may determine the at least one user requires the delivery of water in the real world during the current metaverse activity when the at least one user is talking for more than five minutes. In another example, during the past metaverse activity, the at least one user may have walked and/or gestured toward the table with food. In this example, since the at least one user walked and/or gestured toward the table with food during the past metaverse activity, the physical delivery synchronization program 150 may determine the at least one user requires the delivery of food in the real world during the current metaverse activity.

According to at least one embodiment, the determination that the at least one user requires the physical delivery of the one or more physical objects is made based on the one or more wearable devices of the at least one user. For example, an IoT feed from a smartwatch of the at least one user may indicate a heart rate of the at least one user and a perspiration of the at least one user has risen above a threshold level. In this example, since the heart rate and perspiration of the at least one user has risen above the threshold level, the physical delivery synchronization program 150 may determine the at least one user requires the delivery of medication in the real world during the current metaverse activity to control the heart rate and perspiration.

In response to determining the at least one user in the metaverse activity requires the physical delivery of the one or more physical objects (step 206, "Yes" branch), the physical delivery synchronization process 200 proceeds to step 208 to identify the time at which the at least one user requires the physical delivery of the one or more physical objects during the metaverse activity based on the identified context. In response to determining the at least one user in the metaverse activity does not require the physical delivery of the one or more physical objects (step 206, "No" branch), the physical delivery synchronization process 200 ends.

Then, at 208, the physical delivery synchronization program 150 identifies the required time at which the at least one user requires the physical delivery of the one or more physical objects during the metaverse activity. The required time is identified based on the identified context. The required time may be synchronized with the progression of the metaverse activity.

For example, where the image analysis indicates that food is being served on a table in the metaverse and the at least one user is walking toward and/or gesturing (e.g., pointing toward) the table with the food, the required time may be the point in the metaverse activity that the food is being served on the table in the metaverse. In another example, where the audio analysis indicates the at least one user said, "After this song, I'm going to get something to eat," the required time may be the point in the metaverse activity when the song ends.

In another example, during the past metaverse activity, where the biometrics of the user indicate the user gets dehydrated after talking for more than five minutes, the required time may be the point in the metaverse activity five minutes from when the at least one user begins to speak. In another example, during the past metaverse activity, where the at least one user walked and/or gestured toward the table with food, the required time may be the point in the metaverse activity that the at least one user begins walking and/or gesturing.

According to at least one embodiment, identifying the required time at which the at least one user requires the physical delivery of the one or more physical objects during the metaverse activity may include deriving a sequence in which the one or more physical objects are to be onboarded based on a criticality of the one or more physical objects. For example, where the IoT feed from the smartwatch of the at least one user indicates the heart rate of the at least one user and the perspiration of the at least one user has risen above a threshold level, the medication to be delivered to the at least one user may be classified as most critical. Contrarily, when the user walks and/or gestures toward the table with food in the metaverse, the food to be delivered to the at least one user may be classified as moderately critical. The onboarding of the one or more physical objects is described in further detail below with respect to step 210.

Next, at 210, the physical delivery synchronization program 150 causes the at least one robotic device to onboard the one or more physical objects to be delivered in advance of the required time. The at least one robotic device may be a ground-based robotic device (e.g., a robotic trolley as illustrated in FIG. 3) and/or a aerial robotic device (e.g., a drone). A set of commands may be generated by the physical delivery synchronization program 150 and sent to the at least one robotic device. The generated set of commands may include the sequence in which the one or more physical objects are to be onboarded. The sequence may be from most critical to least critical. For example, where the medication is classified as most critical and the food is classified as moderately critical, the generated set of commands may cause the at least one robotic device to onboard the medication before the food.

In another example, where the required time is the point in the metaverse activity that the food is being served on the table in the metaverse, the at least one robotic device may onboard the food in the real world before the food is served on the table in the metaverse. In another example, where the required time is the point in the metaverse activity when the song ends, the at least one robotic device may onboard the food in the real world before the song ends.

In another example, based on the historical data, where the required time is the point in the metaverse activity five minutes from when the at least one user begins to speak due to dehydration, the at least one robotic device may onboard the water in the real world when the at least one user begins speaking. In another example, based on the historical data, where the required time is the point in the metaverse activity that the at least one user begins walking and/or gesturing, the at least one robotic device may onboard the food in the real world before the user begins walking and/or gesturing.

According to at least one embodiment, the physical delivery synchronization program 150 may identify the capabilities of the at least one robotic device prior to onboarding the one or more physical objects. Examples of the capabilities may include, but are not limited to, dimensions of the at least one robotic device, movement capabilities of the at least one robotic device (e.g., ground or air), and/or tools of the at least one robotic device (e.g. a robotic arm). For example, a heavier physical object may be onboarded by a larger robotic device having ground transportation capabilities, whereas a lighter physical object may be onboarded by a smaller robotic device having aerial transportation capabilities.

Then, at 212, the physical delivery synchronization program 150 deploys the at least one robotic device to deliver the onboarded one or more physical objects to the physical location of the at least one user at the required time. After onboarding the one or more physical objects, the generated set of commands may place the at least one robotic device into a queue in a standby state to ready the at least one robotic device for delivery at the required time. For example, the robotic trolley and the drone may be placed in the queue.

The physical delivery synchronization program 150 may track the movements of the at least one user in the real world in addition to the metaverse. The at least one robotic device may then be deployed from the queue to deliver the onboarded one or more physical objects to the physical location of the at least one user. For example, the robotic trolley may be deployed to deliver food to the physical location of the at least one user at the required time. In another example, the drone may be deployed to deliver a package to the physical location of the at least one user at the required time.

According to at least one embodiment, deploying the at least one robotic device to deliver the onboarded one or more physical objects to the physical location of the at least one user at the required time may include adapting the required time at which the at least one robotic device is deployed in response to determining there is a change in the identified context. For example, where the context indicates that food is being served on the table during the metaverse activity and the at least one user is walking toward the table, the at least one user may have to take a phone call before the at least one user reaches the table. In this example, the required time may be adapted until after the phone call ends. In another example, where the context indicates that the at least one user is attending a business meeting in the metaverse, the meeting may run longer than expected. In this example, the required time may be adapted until after the business meeting ends.

Next, at 214, the physical delivery synchronization program 150 integrates the one or more physical interactions of the at least one user with the delivered one or more physical objects into the metaverse activity. Once the onboarded one or more physical objects have been delivered to the at least one user, the at least one user may perform one or more physical interactions with the one or more physical objects.

The one or more physical interactions may be captured by the AR or VR headset. For example, the at least one user may be picking up and eating the food after being delivered the food by the at least one robotic device. In another example, the at least one user may be opening a package after being delivered the package by the at least one robotic device. As the at least one user performs the one or more physical interactions, the one or more physical interactions may be converted into one or more virtual interactions and integrated into the metaverse activity.

According to at least one embodiment, integrating the one or more physical interactions of the at least one user with the delivered one or more physical objects into the metaverse activity may include converting the deployed at least one robotic device into a virtual object. The virtual object delivering the onboarded one or more physical objects may be integrated into the metaverse activity. For example, the robotic trolley and/or the drone may be converted into the virtual object and integrated into the metaverse activity.

Referring now to FIG. 3, an exemplary diagram 300 depicting users participating in a metaverse activity is shown according to at least one embodiment. In the diagram 300, the metaverse activity 302 may include multiple users participating in a virtual party. The multiple users may have their avatars and/or character included in the metaverse activity 302. During the metaverse activity 302, the one or more virtual objects 304 may be served to the multiple users. For example, the one or more virtual objects 304 may include food on a plate. The at least one user may walk and/or gesture toward the one or more virtual objects 304, which may indicate the at least one user requires the delivery of a corresponding physical object in the real world. The at least one robotic device 306 may onboard the one or more physical objects and deliver the onboarded one or more physical objects to the physical location of the at least one user at the required time. For example, the at least one robotic device 306 may be the robotic trolley that is deployed to deliver the onboarded one or more physical objects to the physical location of the at least one user at the required time. Once the one or more physical objects have been delivered, the one or more physical interactions of the at least one user with the delivered one or more physical objects may be integrated into the metaverse activity 302.

It may be appreciated that FIGS. 2 and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of synchronization of physical delivery with a metaverse activity, the method comprising:

receiving real-time and historical data relating to a metaverse activity;

identifying a context of the metaverse activity based on the real-time data;

determining whether at least one user whose avatar is in the metaverse activity requires a physical delivery of one or more physical objects based on the real-time and the historical data;

in response to determining the at least one user whose avatar is in the metaverse activity requires the physical delivery:

identifying a time at which the at least one user whose avatar is in the metaverse activity requires the physical delivery of the one or more physical objects during the metaverse activity based on the identified context, wherein the required time is synchronized with a progression of the metaverse activity;

causing at least one robotic device to onboard the one or more physical objects to be delivered in advance of the required time;

deploying the at least one robotic device to deliver the onboarded one or more physical objects to a physical location of the at least one user whose avatar is in the metaverse activity at the required time; and integrating one or more physical interactions of the at least one user whose avatar is in the metaverse activity with the delivered one or more physical objects into the metaverse activity, wherein integrating the one or more physical interactions of the at least one user whose avatar is in the metaverse activity with the delivered one or more physical objects into the metaverse activity further includes converting the one or more physical interactions into one or more virtual interactions and integrating the one or more virtual interactions into the metaverse activity.

2. The computer-based method of claim 1, wherein integrating the one or more physical interactions of the at least one user with the delivered one or more physical objects into the metaverse activity further comprises:

converting the deployed at least one robotic device into a virtual object, wherein the virtual object delivering the onboarded one or more physical objects is integrated into the metaverse activity.

3. The computer-based method of claim 1, wherein identifying the time at which the at least one user requires the physical delivery of the one or more physical objects during the metaverse activity further comprises:

deriving a sequence in which the one or more physical objects are to be onboarded based on a criticality of the one or more physical objects.

4. The computer-based method of claim 1, wherein the determination that the at least one user requires the physical delivery of the one or more physical objects is made based on one or more wearable devices of the at least one user.

5. The computer-based method of claim 1, wherein deploying the at least one robotic device to deliver the onboarded one or more physical objects to the physical location of the at least one user at the required time further comprises:

adapting the required time at which the at least one robotic device is deployed in response to determining there is a change in the identified context.

6. The computer-based method of claim 1, wherein the physical object is selected from a group consisting of a food, a drink, and a package.

7. A computer system, the computer system comprising: one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

receiving real-time and historical data relating to a metaverse activity;

identifying a context of the metaverse activity based on the real-time data;

determining whether at least one user whose avatar is in the metaverse activity requires a physical delivery of one or more physical objects based on the real-time and the historical data;

in response to determining the at least one user whose avatar is in the metaverse activity requires the physical delivery:

identifying a time at which the at least one user whose avatar is in the metaverse activity requires the physical delivery of the one or more physical objects during the metaverse activity based on the identified context, wherein the required time is synchronized with a progression of the metaverse activity;

causing at least one robotic device to onboard the one or more physical objects to be delivered in advance of the required time;

deploying the at least one robotic device to deliver the onboarded one or more physical objects to a physical location of the at least one user whose avatar is in the metaverse activity at the required time; and integrating one or more physical interactions of the at least one user whose avatar is in the metaverse activity with the delivered one or more physical objects into the metaverse activity, wherein integrating the one or more physical interactions of the at least one user whose avatar is in the metaverse activity with the delivered one or more physical objects into the metaverse activity further includes converting the one or more physical interactions into one or more virtual interactions and integrating the one or more virtual interactions into the metaverse activity.

8. The computer system of claim 7, wherein integrating the one or more physical interactions of the at least one user with the delivered one or more physical objects into the metaverse activity further comprises:

converting the deployed at least one robotic device into a virtual object, wherein the virtual object delivering the onboarded one or more physical objects is integrated into the metaverse activity.

9. The computer system of claim 7, wherein identifying the time at which the at least one user requires the physical delivery of the one or more physical objects during the metaverse activity further comprises:

deriving a sequence in which the one or more physical objects are to be onboarded based on a criticality of the one or more physical objects.

10. The computer system of claim 7, wherein the determination that the at least one user requires the physical delivery of the one or more physical objects is made based on one or more wearable devices of the at least one user.

11. The computer system of claim 7, wherein deploying the at least one robotic device to deliver the onboarded one or more physical objects to the physical location of the at least one user at the required time further comprises:

adapting the required time at which the at least one robotic device is deployed in response to determining there is a change in the identified context.

12. The computer system of claim 7, wherein the physical object is selected from a group consisting of a food, a drink, and a package.

13. A computer program product, the computer program product comprising:
one or more computer-readable tangible storage medium and program instructions stored on at least one of the one or more computer-readable tangible storage medium, the program instructions executable by a processor capable of performing a method, the method comprising:
receiving real-time and historical data relating to a metaverse activity;
identifying a context of the metaverse activity based on the real-time data;
determining whether at least one user whose avatar is in the metaverse activity requires a physical delivery of one or more physical objects based on the real-time and the historical data;
in response to determining the at least one user whose avatar is in the metaverse activity requires the physical delivery:
identifying a time at which the at least one user whose avatar is in the metaverse activity requires the physical delivery of the one or more physical objects during the metaverse activity based on the identified context, wherein the required time is synchronized with a progression of the metaverse activity;
causing at least one robotic device to onboard the one or more physical objects to be delivered in advance of the required time;
deploying the at least one robotic device to deliver the onboarded one or more physical objects to a physical location of the at least one user whose avatar is in the metaverse activity at the required time; and
integrating one or more physical interactions of the at least one user whose avatar is in the metaverse activity with the delivered one or more physical objects into the metaverse activity, wherein integrating the one or more physical interactions of the at least one user whose avatar is in the metaverse activity with the delivered one or more physical objects into the metaverse activity further includes converting the one or more physical interactions into one or more virtual interactions and integrating the one or more virtual interactions into the metaverse activity.

14. The computer program product of claim 13, wherein integrating the one or more physical interactions of the at least one user with the delivered one or more physical objects into the metaverse activity further comprises:
converting the deployed at least one robotic device into a virtual object, wherein the virtual object delivering the onboarded one or more physical objects is integrated into the metaverse activity.

15. The computer program product of claim 13, wherein identifying the time at which the at least one user requires the physical delivery of the one or more physical objects during the metaverse activity further comprises:
deriving a sequence in which the one or more physical objects are to be onboarded based on a criticality of the one or more physical objects.

16. The computer program product of claim 13, wherein the determination that the at least one user requires the physical delivery of the one or more physical objects is made based on one or more wearable devices of the at least one user.

17. The computer program product of claim 13, wherein deploying the at least one robotic device to deliver the onboarded one or more physical objects to the physical location of the at least one user at the required time further comprises:
adapting the required time at which the at least one robotic device is deployed in response to determining there is a change in the identified context.

* * * * *